United States Patent [19]
Fisherman et al.

[11] Patent Number: 5,657,470
[45] Date of Patent: Aug. 12, 1997

[54] PERSONAL COMPUTER HARD DISK PROTECTION SYSTEM

[75] Inventors: Igor Fisherman, Philadelphia; Oleg V. Kouznetsov, Feasterville; Sergey P. Pavlishin, Feasterville; Alexander N. Shatilov, Feasterville, all of Pa.

[73] Assignee: YBM Technologies, Inc., Newtown, Pa.

[21] Appl. No.: 547,211

[22] Filed: Oct. 24, 1995

Related U.S. Application Data

[63] Continuation-in-part of Ser. No. 336,450, Nov. 9, 1994, Pat. No. 5,586,301.

[51] Int. Cl.⁶ .................................................. G06F 13/00
[52] U.S. Cl. ........................ 395/480; 364/DIG. 1; 380/3; 380/4; 380/25; 395/427; 395/479; 395/481; 395/497.04
[58] Field of Search ............ 380/3, 4, 25; 395/427, 395/479, 480, 481, 497.04

[56] References Cited

U.S. PATENT DOCUMENTS

| | | |
|---|---|---|
| 4,742,447 | 5/1988 | Duvall et al. . |
| 4,787,027 | 11/1988 | Prugh et al. . |
| 4,975,950 | 12/1990 | Lentz ........................... 380/4 |
| 5,113,518 | 5/1992 | Durst, Jr. et al. . |
| 5,144,659 | 9/1992 | Jones ........................... 380/4 |
| 5,263,147 | 11/1993 | Francisco et al. . |
| 5,289,540 | 2/1994 | Jones ........................... 380/4 |
| 5,421,006 | 5/1995 | Jablon et al. .............. 395/575 |
| 5,483,649 | 1/1996 | Kuznetsov et al. ......... 395/186 |

FOREIGN PATENT DOCUMENTS

| | | |
|---|---|---|
| 026813A2 | 5/1988 | European Pat. Off. . |
| 0407060A2 | 1/1991 | European Pat. Off. . |
| 0458718A2 | 11/1991 | European Pat. Off. . |
| 4034444A1 | 5/1992 | Germany . |
| 2222899 | 3/1990 | United Kingdom . |
| 2242295 | 9/1991 | United Kingdom . |
| 2248324 | 4/1992 | United Kingdom . |
| WO 90/12464 | 10/1990 | WIPO ....................... H04L 9/00 |
| WO 90/13084 | 11/1990 | WIPO . |

*Primary Examiner*—Frank J. Asta
*Attorney, Agent, or Firm*—Caesar, Rivise, Bernstein Cohen & Pokotilow, Ltd.

[57] ABSTRACT

The personal computer hard disk protection system is designed to protect data stored on computer hard disks of computers utilizing non-ISA buses while permitting multiple user operation. The personal computer hard disk protection system prevents unauthorized access to the hard disk by software applications, and permits safe servicing of requests which use the BIOS. The basis for the personal computer hard disk protection system functions is the dynamic transformation of the file system to the configuration of the current user. The system is based on a hardware device called the protection-program support module and a set of protection programs, most of which is stored in the protection-program support module. The protection program support module is an external board and is connected to the computer system bus and to the base IDE connection level, the latter of which is controlled by the protection program support module for either permitting or denying access to the hard disk.

33 Claims, 10 Drawing Sheets

PERSONAL COMPUTER HARD DISK PROTECTION SYSTEM

This application is a Continuation-in-Part of Application Ser. No. 08/336,450, filed Nov. 9, 1994, U.S. Pat. No. 5,586,301, entitled PERSONAL COMPUTER HARD DISK PROTECTION SYSTEM, assigned to the same assignee as this invention and whose disclosure is incorporated by reference herein.

SPECIFICATION

1. Field of the Invention

The invention pertains to apparatus for protecting data stored on a computer from inadvertent or intentional distortion. In particular, this invention concerns a hard disk protection system that protects data stored on a personal computer system that is accessible to a plurality of users.

2. Background of the Invention

The most general and progressive approach to shared information processing using personal computers is to join the computers into a local area network (LAN). LAN's facilitate data gathering and allow more efficient use of personal computer memory. However, these networks also provide favorable conditions for the rapid spread of programs known as computer viruses, and thus increase the risk of massive distortion of the information on the personal computer hard disks. LAN's are particularly vulnerable to computer viruses which distort information for the purpose of causing economic loss to the information owners. Because of the enormous losses caused by existing viruses and the continual introduction of new viruses, personal computers have to be equipped with protection subsystems which prevent the deliberate distortion of information. However, despite the wide variety of available file-protection subsystems, computer crime statistics indicate that computer viruses are as dangerous as ever and are still capable of causing enormous losses to personal computer users. Users of personal computers connected in LAN's have a much higher risk than users of isolated computers. Therefore, there is still an urgent need to improve the methods and means of protecting computer files, especially for LAN-linked computers.

An analysis of current methods and means of protecting computer files shows that the most reliable protection is provided by subsystems which use dedicated hardware to support the protection programs. One particularly effective way of protecting computer files is to use specialized processors acting as a connecting link between the central processor and the file storage device. A typical example of a highly reliable protection subsystem is the computer file protection subsystem developed and patented by Empirical Research System, Inc. (Computer File Protection System: International Publication No. WO 90/13084, C06F 12/14. Application submitted Apr. 19, 1989, published Nov. 1, 1990). This subsystem can be accessed by the operating system for modifications only during installation. The hardware for this subsystem includes programmable external memory and a programmable external control device. The programmable control device is based on a digital microprocessor and is installed as an intermediate link between the central processor and the file storage device. The programmable control device monitors the control logic signals, the address signals, and the data signals formed by the central processor. An auxiliary memory stores file-access criteria established by the supervisor. The control device checks for file access authorization and prevents access attempts that do not meet the established criteria. The control device also reads the signatures of all the protected files and compares the signatures of the loaded files with the reference signatures. To store the file signatures, the controller creates a protected memory region that is inaccessible to the operating system. In the event of any deviation from the established protection criteria, the protection subsystem prohibits the use of the computer.

An obvious disadvantage of the above-described subsystem is that any user can view the disk directories. This circumstance permits complete viewing of the disk directories, and encourages unsanctioned activity by users wishing to study and distort the data of other users. Another obvious disadvantage of the above-described subsystem is that the hardware serving as the intermediate link between the central processor and the file storage device must be located on a board which connects to the file storage device or on the boards of other devices. As a result, this protection subsystem requires additional hardware and does not provide the most efficient use of the existing hardware.

OBJECTS OF THE INVENTION

Accordingly, it is the general object of this invention to provide apparatus which address the aforementioned needs.

It is another object of this invention to eliminate the need to monitor requests at the operating system level and at the modular device driver level of the personal computer.

It is yet another object of this invention to require less complicated hardware.

It is still yet another object of this invention to provide a personal computer hard disk protection system that can be implemented with personal computers that utilize non-ISA (Industrial Standard Architecture) buses.

It is still yet another object of this invention to provide a personal computer hard disk security system that can intercept all input/output calls at the base IDE (Integrated Drive Electronics) connection level.

SUMMARY OF THE INVENTION

These and other objects of the instant invention are achieved by providing a hard disk protection system for protecting data stored on a hard disk of a personal computer having a non-ISA bus and having a base IDE connection level. Moreover, this personal computer is available to a plurality of users. The hard disk has logical disk structure including an operating system having logical drives. The system comprises protection programs that interpret the logical drives as a fixed set of zones on the hard disk for a particular user and wherein each of the fixed set of zones have respective access rules. The system also includes a hardware module responsive to the protection programs, that either allows or denies access to the hard disk at the base IDE connection level based on the access rules. The hardware module has a first memory that is inaccessible to the central processing unit and a second memory that is accessible to the central processing unit.

DESCRIPTION OF THE DRAWINGS

Other objects and many of the attendant advantages of this invention will be readily appreciated as the same becomes better understood by reference to the following detailed description when considered in connection with the accompanying drawings wherein the structure and functional organization of the data protection and sharing system are illustrated in the following drawings.

DESCRIPTION OF THE INVENTION

Figure 1:
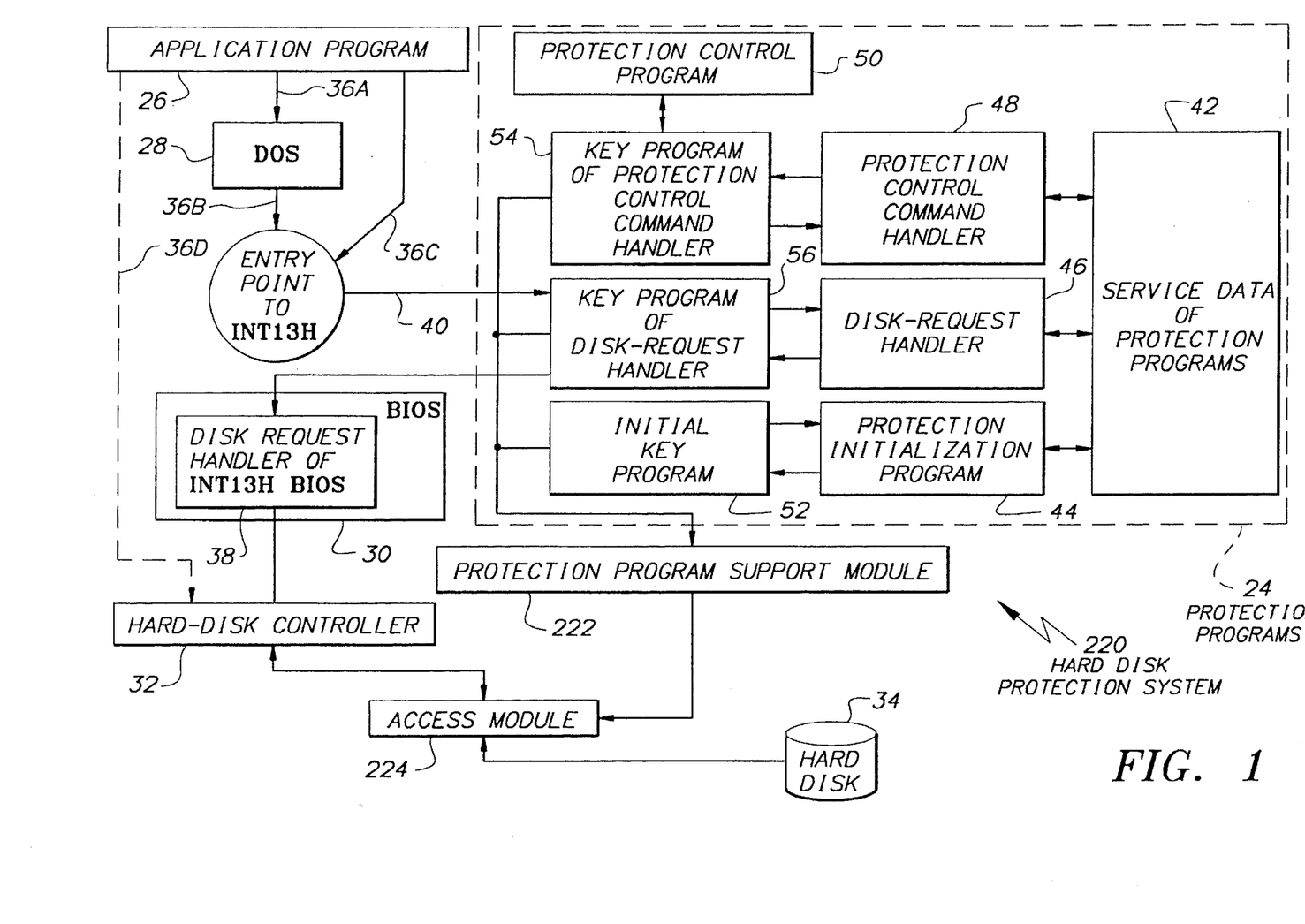
FIG. 1 is a structural block diagram of the hard disk protection system installed in a computer.

Referring now in detail to the various figures of the drawing wherein like reference characters refer to like parts, there is shown at 220 in FIG. 1, a personal computer hard disk protection system (HDPS) that comprises a hardware module 222, known as the protection-program support module (PPSM), an access module 224 and protection software 24. At this juncture, it is necessary to point out that the protection software 24 is subject matter of U.S. Application Ser. No. 08/336,450, assigned to the same assignee as this invention and whose disclosure is also incorporated by reference herein. The only difference between the HDPS 220 and the HDPS 20 of U.S. Application Ser. No. 08/336,450 is the introduction of the access module 224. Hence, in the interest of brevity, there will be no further discussion of the protection programs 24 other than to relate their operation with the PPSM 222 and the access module 224.

Furthermore, the hardware of the PPSM 222 is based on the PPSM 120B as set forth in U.S. Application Ser. No. 08/269,591 (now U.S. Pat. No. 5,483,649), also assigned to the same assignee as this invention and whose disclosure is also incorporated by reference herein.

The HDPS 220, by utilizing the access module 224, resolves the problem of hard drive controllers 32 being on a separate bus, different from the buses that the PPSM 222 is coupled to. For example, in some personal computer systems, the hard disk controllers may be located on a PCI (Peripheral Component Interconnect) bus, VESA (Video Electronics Standards Association) bus, a processor's local bus (which does not connect directly to the peripheral bus but rather ties the processor to memory, cache or occasionally to some peripherals that are not on the peripheral bus) or other non-ISA bus. In those situations, the PPSM 22 of U.S. Application Ser. No. 08/336,450 and the PPSM 120B of U.S. Application Ser. No. 08/269,591 (now U.S. Pat. No. 5,483,649), both being located on the ISA bus, cannot intercept hard disk input/output calls from other buses. On the other hand, as will be discussed in detail later, the PPSM 222 via the access module 224 can intercept these non-ISA bus hard disk input/output calls at the base IDE connection level.

Moreover, various manufacturers may implement their own Superset of the ISA standards. Since it is impossible to determine what the effect of such unknown implementations are, the PPSM 22/PPSM 120B, by themselves, may not prevent unauthorized input/output calls to the hard disk 34. On the other hand, the PPSM 222 via the access module 224 can intercept these ISA bus hard disk input/output calls at the base IDE connection level.

As shown in FIG. 1, a conventional personal computer system basically comprises application software 26, an operating system 28 (e.g., DOS or WINDOWS, etc., hereinafter "OS") and a basic input/output system (BIOS) 30. Typically, access to the hard disk controller 32 (and, thereby, the hard disk 34 itself) from the application program 26 is via the entry point 34 to the standard BIOS handler known as INT 13H BIOS, as shown by paths 36A–36C. In some cases, access from the application program 26 to the hard disk controller 32 is direct, as shown by path 36D.

However, with the HDPS 220 coupled to the personal computer system, as will be discussed in detail later, the HDPS 220 prevents direct access to the hard-disk controller 34 by the application program 26 (as indicated by the hatched access path line 36D) and ensures security for disk access using the BIOS disk-request handler 38. In order to verify and ensure the security of disk requests using, INT 13H BIOS, the HDPS 220 uses a link 40 with the BIOS input. This link 40 is established by modifying the interrupt vector table to replace the address of the original handler of INT 13H BIOS with the address of the key program of the disk-request handler.

The protection software 24 comprises a set of protection programs which create service data 42 for use in the HDPS 220 processes. These service data 42 of the protection programs are a separate information component. The set of protection programs includes a protection initialization program 44, a disk-request handler 46, a control-command handler 48, a protection control program 50, and a set of key programs, which includes the initial key program 52, the command-handler key program 54, and the request-handler key program 56.

The set of protection programs is stored on the hard disk 34 and in the PPSM 222. In particular, the protection control program 50 is stored as an ordinary file on the hard disk 34. The other protection programs are stored in the PPSM 222.

Figure 2:
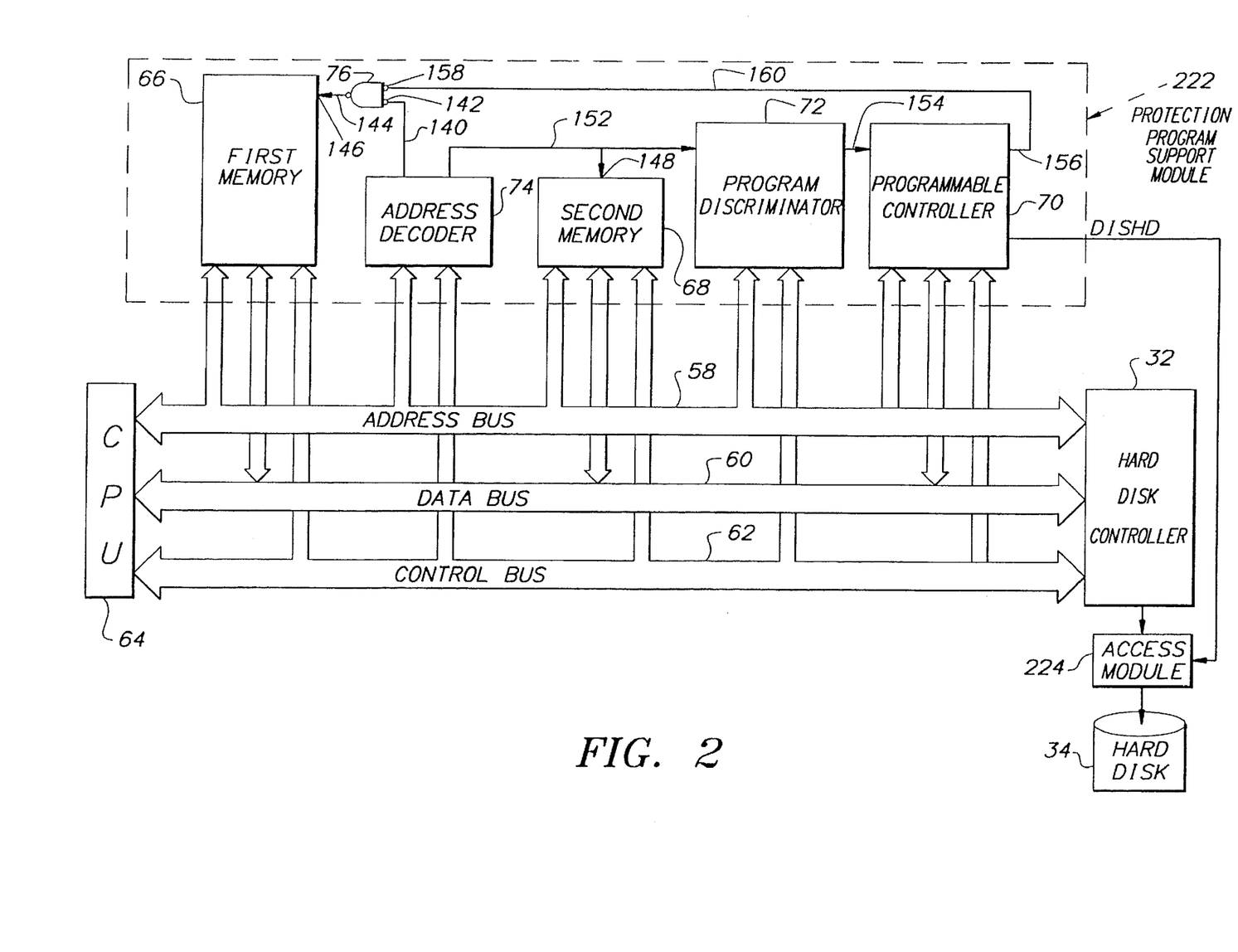
FIG. 2 is a structural block diagram of the protection program support module and the access module.

The PPSM 222 provides hidden storage of the protection programs and establishes a logical relationship between the ability to access the hard disk 34 and the execution phase of the protection programs. As shown in FIG. 2, the PPSM 222 comprises an external board connected to the peripheral bus (i.e., the address bus 58, data bus 60 and control bus 62 which depict an ISA bus) of the personal computer, and has two operating modes: active and passive. In the active mode, the PPSM 222 activates the access module 224 to deny access to the hard disk 34. In the passive mode, the PPSM 222 does not activate the access module 224, thereby permitting access to the hard disk 34. In order to obtain free access to the hard disk 34, the CPU 64 must switch the PPSM 222 to the passive mode, and to do this, the CPU 64 must use one of the key programs. The reason for the use of the key programs is that the PPSM 222 determines the type of program which is attempting to change the status, and the PPSM 222 allows a change in its status only if flags are present indicating that the key program is active. After the PPSM 222 is switched to the passive mode, the key program transfers control to the protection programs stored in the PPSM 222.

The PPSM 222 comprises a first memory 66, a second memory 68, a programmable controller 70, and a program discriminator 72. The first memory 66 stores the protection programs and can be made inaccessible to the CPU 64. The second memory 68, which is always accessible to the CPU 64, stores the set of key programs which are used to change the status of the PPSM 222. The programmable controller 70 prevents access to the hard disk 34 and forbids access to the first memory 66. The CPU 64 can program the mode of the programmable controller 70 only when a signal is present indicating that one of the key programs is active. The program discriminator 72 determines the type of program acting on the programmable controller 70 and establishes a logical relationship between the ability to switch the PPSM 222 mode and the type of program acting on the programmable controller 70. If flags are present indicating that one of the key programs is active, the program discriminator 72 allows the entry of information into the programmable controller 70. Otherwise, the program discriminator 72 does not permit the entry of information in the programmable controller 70. The PPSM 222 also includes an address decoder 74 and an AND gate 76.

The module memories 66 and 68 should occupy the address space for the external-device ROM. The programmable controller 70 should be set for the address of the control register of the hard disk controller 32. With regard to hard disk controllers 32 which have an IDE (Integrated Drive Electronics) interface, the programmable controller 32 should be set to the hexadecimal address 177 or 1F7.

The operation of the PPSM 222 will now be discussed.

Figure 3:
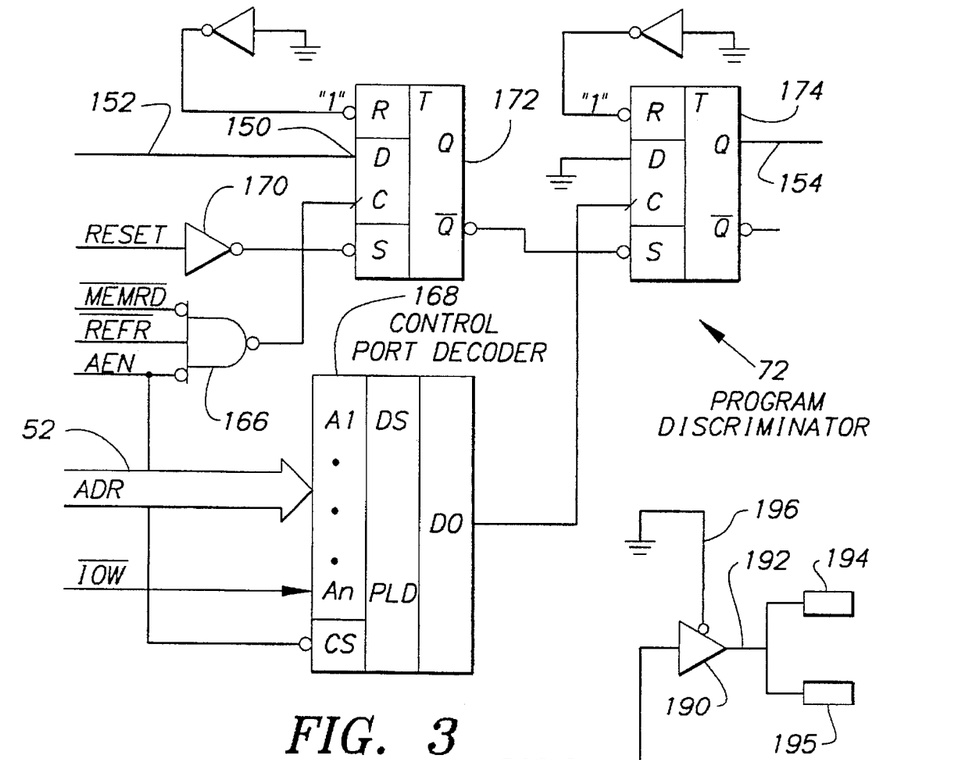
FIG. 3 is a functional block diagram of the program discriminator.

The program discriminator 72 (FIG. 3) comprises an AND gate 166, a control-port decoder 168, an inverter 170, and two D-type flip-flops 172 and 174. The programmable controller 70 (FIG. 4) comprises a port decoder 176, a mode register 178, and a buffer 180.

The PPSM 222 is reset by the RESET signal (FIGS. 3 and 4) from the system reset line. In particular, the RESET signal is transmitted to the input of the inverter 170 (FIG. 3), the output of which is connected to the S-input of the D-type flip-flop 172 of the program discriminator 72; the RESET signal is also transmitted to the R-input of the mode register 178 (FIG. 4) of the programmable controller 70. The RESET signal to the inverter 170 sets the flip-flop 172, which in turn generates a low level logic signal from the inverted output $\bar{Q}$ of the flip-flop 172. This low level logic signal from the inverted output $\bar{Q}$ sets the S-input of the D-type flip-flop 174 which in turn generates a high level logic signal from direct output Q of the flip-flop 174. This high-level logic signal at the direct output Q of the flip-flop 174 of the program discriminator 72 is transmitted through line 154 to the programmable controller 70, thereby permitting installation of data input into the mode register 178 of the programmable controller 70.

Figure 4:
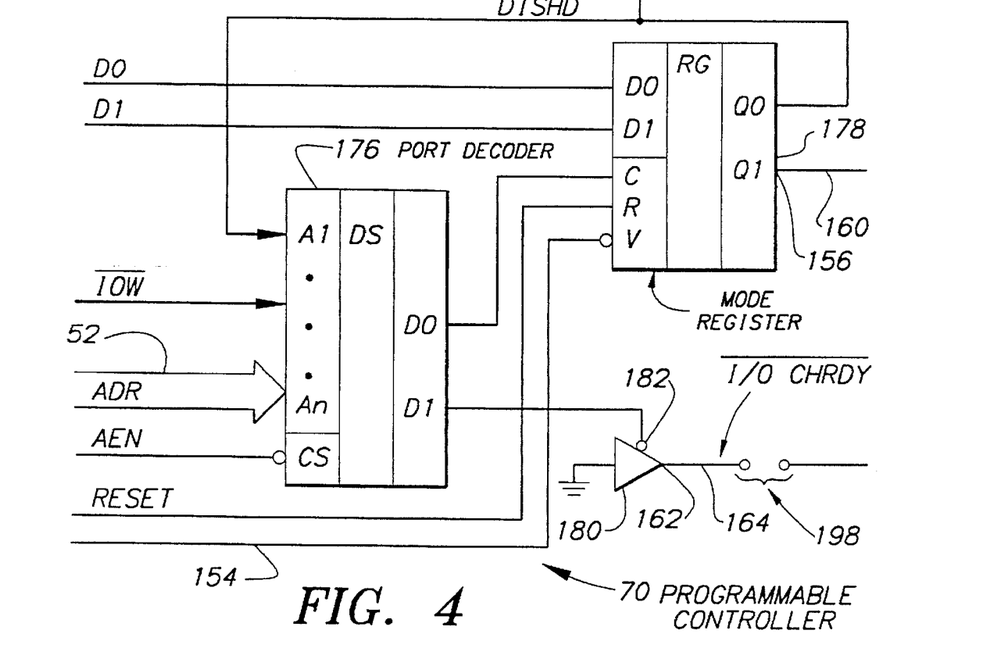
FIG. 4 is a functional block diagram of the programmable controller.

As shown in FIG. 4, the system-RESET signal feeds into the R-input of the mode register 178 which resets the register 178, thereby causing the Q0 output of the mode register 178 to send a low-level logic signal to the A1 of the port decoder 176. At the Q1 output (memory access control output 156 of the programmable controller 70) of the mode register 178 there is also a low-level logic signal, which is sent through line 160 to the second input 158 of the AND gate 76. The low-level logic signal on line 160 enables the second input 158 of the AND gate 76, thereby permitting the transmission of select signals for the first memory 66 as requested by the address decoder 74 via line 140. The output 144 of AND gate 76 is thereby connected to the select input 146 of the first memory 66; i.e., the first memory 66 becomes accessible to the CPU 64.

With the above-described combination of signals at the port-decoder 176 inputs, a high-level logic signal is present at the second output (D1) of the decoder 176 and is sent to the input of the control input 182 of buffer 180. This high-level signal at the control input 182 causes the output 162 of the buffer 180 to convert to a high impedance state which does not affect the command from the hard disk controller 32 to the hard disk 34.

Thus, the initial state of the PPSM 222 is the passive mode, and the first memory 66 is read-accessible. In this regard, it should be noted that the RESET signal causes the CPU 64 to determine the personal-computer configuration and transfer control to programs resident in the external-device ROM. Since the first memory 66 of the PPSM 222 occupies the region of address space reserved for the external-device ROM, the protection programs 24 receive control before the OS 28 is loaded. As a result, the protection programs 24 can switch the PPSM 222 into the required mode before the personal computer is in the ready state. In particular, the protection programs 24 can switch the PPSM 222 into the active mode after the OS 28 is loaded. In addition, the protection programs 24 can prevent access to the first memory 66 and can be hidden from the applications software 22 and the OS 28.

In order to change the mode of the PPSM 222, the CPU 64 must enter the code for the desired mode into the mode register 178 of the programmable controller 70. The protection programs 24 change the mode of the PPSM 222 using a corresponding version of the key program stored in the second memory 68. During the extraction of key program codes, the second output of the address decoder 74 produces a low-level logic signal, which is sent through line 152 to the select input 148 of the second memory 126. This signal also is transmitted to the control input 150 of the program discriminator 72. The other inputs of the program discriminator 72, which are connected to the system control lines 54, receive signals specifying the type of bus cycle.

In particular, the $\overline{\text{MEMRD}}$ input (FIG. 3) of the AND gate 76 receives pulsed signals which specify the read-memory bus cycles. If the $\overline{\text{REFR}}$ (refresh) input and AEN (address enable) input to the AND gate 76 do not comprise signals used for memory restoration and direct access to memory, then the output of the AND gate 76 will produce pulsed signals which travel to the C-input of the flip-flop 172 and which latch the state of line 152. If there is a low-level logic signal at the D-input (i.e., at control input 150 of program discriminator 72) of the flip-flop 172, then each signal arriving at the C-input of the flip-flop 172 will produce at the inverse output $\bar{Q}$ of the flip-flop 172 a high-level signal which enables the operation of the flip-flop 174. If in that case, an active signal ($\overline{\text{IOW}}$) arrives at the control port decoder 168 from the system output line and if the address at the other inputs of the decoder 168 is the address of the control port, then the output of the control-port decoder 168 will be a pulsed signal indicating key program activity. This signal causes the direct output Q of the flip-flop 174 to have a low-level signal which is sent through line 154 to the first control input (pin V of the mode register 178 (FIG. 4) of the programmable controller 70, and this input acts as the permit mode register 178 setup input.

If an active signal (i.e., a low-level signal is present on line 154) is present at the first control input of the programmable controller 70, the state of the mode register 178 can be changed if another active signal (i.e., low-level signal $\overline{\text{IOW}}$) is present at the port decoder 176 from the system output line and if the other inputs to the decoder 176 have the address which is the address of the control port. If this combination of signals is present at the permit mode register 178 setup input and at the port decoder 176 inputs, then the first output D0 of the port decoder 176 will produce a pulsed signal which sets the given information code at the outputs of the mode register 178.

If the code preventing access to the first memory 66 is entered into the mode register 178 then the Q1 output (i.e., memory access control output 156) of the mode register 178 will produce a high-level signal, which is sent through line 160 to the second input 158 of the AND gate 76. When that high-level signal is present, the AND gate 76 blocks the transmission of the select signals for the first memory 66 from the address decoder 74, as discussed earlier. As a result, the first memory 66 becomes inaccessible to the CPU 64.

If the active mode code is entered into the mode register 178, then the first output Q0 (FIG. 3) of the mode register 178 produces a "disable hard disk" signal DISHD. The DISHD is the command signal transmitted from the PPSM 222 to the access module 224 for denying access to the hard disk 34 when the PPSM 222 is in an active mode. In particular, the DISHD is sent to a buffer 190 whose output line 192 is connected to PPSM connector 194 and 195. The buffer 190 is always enabled through a control line 196 coupled to ground. Hence, wherever the switching of the PPSM 22 as set forth in A.S.N. 08/336,450 from the passive mode to the active mode occurs, instead of the PPSM 222 transmitting a $\overline{I/O\ CH\ RDY}$ signal that prevents the completion of the bus cycle (and, therefore, any further use of the personal computer), the PPSM 222 prevents the selection of a hard drive 34 via the transmission of the DISHD signal to the access module 224. Similarly, wherever the switching of the PPSM 22 as set forth in A.S.N. 08/336,450 from the active mode to the passive mode occurs, instead of the PPSM 222 terminating the $\overline{I/O\ CH\ RDY}$ signal, the PPSM 222 permits the selection of a hard drive 34 by terminating the DISHD signal.

In addition, the DISHD signal is sent to the first input A1 of the port decoder 176. The signal causes the port decoder 176 to verify the bus cycles for CPU 64 access to output devices.

(It should be pointed out at this juncture that the PPSM 222 can be easily modified to operate in accordance with the PPSM of A.S.N. 08/336,450 (i.e., PPSM 22) and 08/269,591 (now U.S. Pat. No. 5,483,649), (.i.e., PPSM 120B) since the hardware which generates a low-level signal on the system ready line $\overline{I/O\ CH\ RDY}$ on the system bus availability line (and, therefore, prevents the completion of the current bus cycle and any further use of the personal computer) remains on the circuit card of the PPSM 222. However, the output of that hardware is physically disconnected from the system ready line. In particular, as shown in FIG. 4, the output line 164 of the buffer 180 has a coupling 198 for receiving a jumper wire (not shown). Without this jumper wire installed, the PPSM 222 cannot affect the system ready line.)

Figure 5:
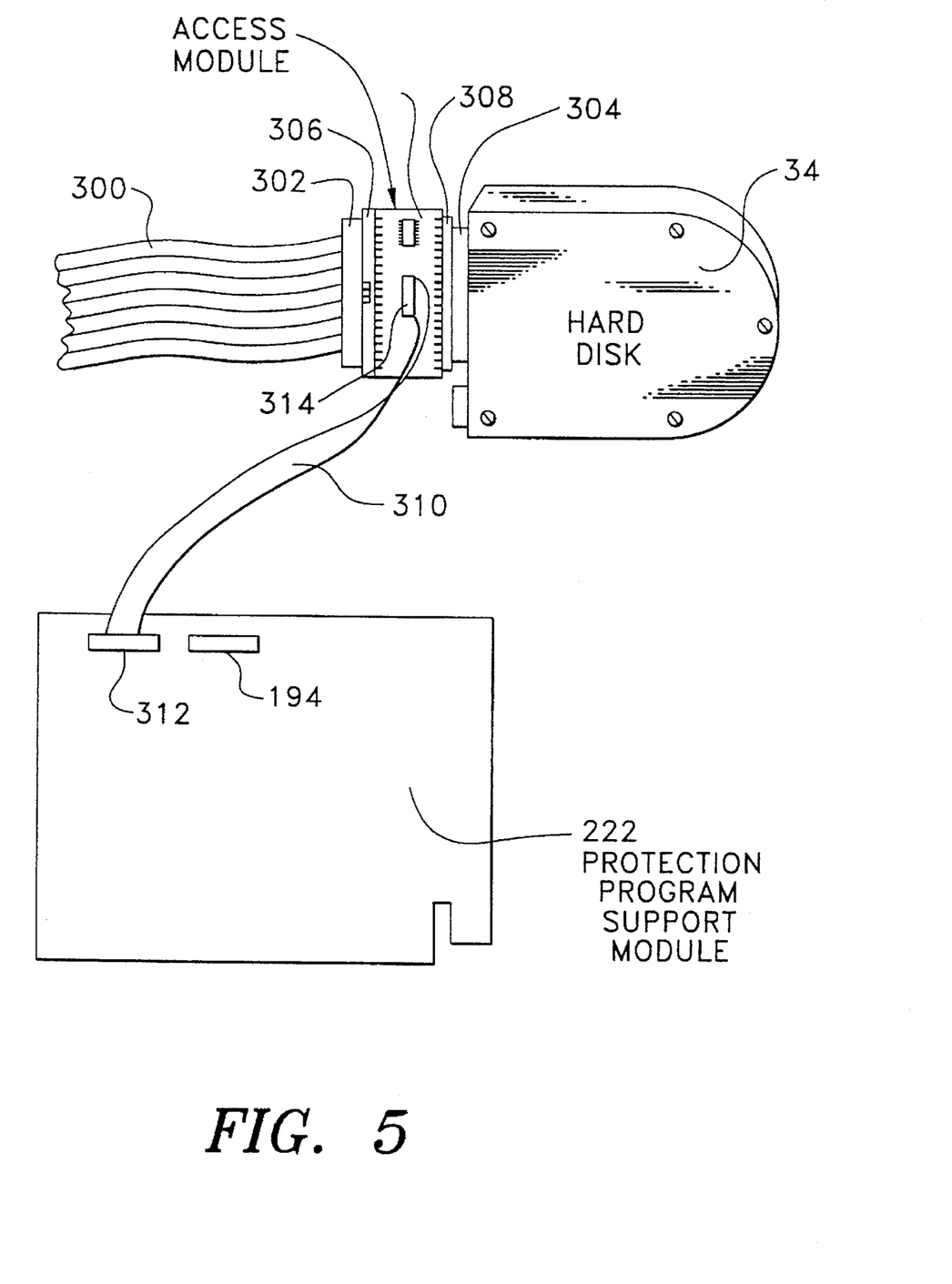
FIG. 5 is an electrical connection interface of the access module, PPSM and the hard disk.

The interconnection of the access module 224, the hard disk 34, and the PPSM 222 is shown in FIG. 5. In a typical personal computer configuration, the hard disk controller 32 is interfaced directly to the hard disk 34 via a standard IDE cable 300. In particular, the IDE cable 300 has a connector 302 that couples directly to a connector 304 on the hard disk 34 itself.

On the other hand, with the HDPS 220 installed in the PC, the standard IDE cable connector 302 is coupled to a first connector 306 on the access module 224 and the access module 224 is directly plugged into the hard disk connector 304 via a second connector 308 on the access module 224. By this connection, the access module 224 is inserted in series between the hard disk controller 32 and the hard disk 34.

Figure 8:
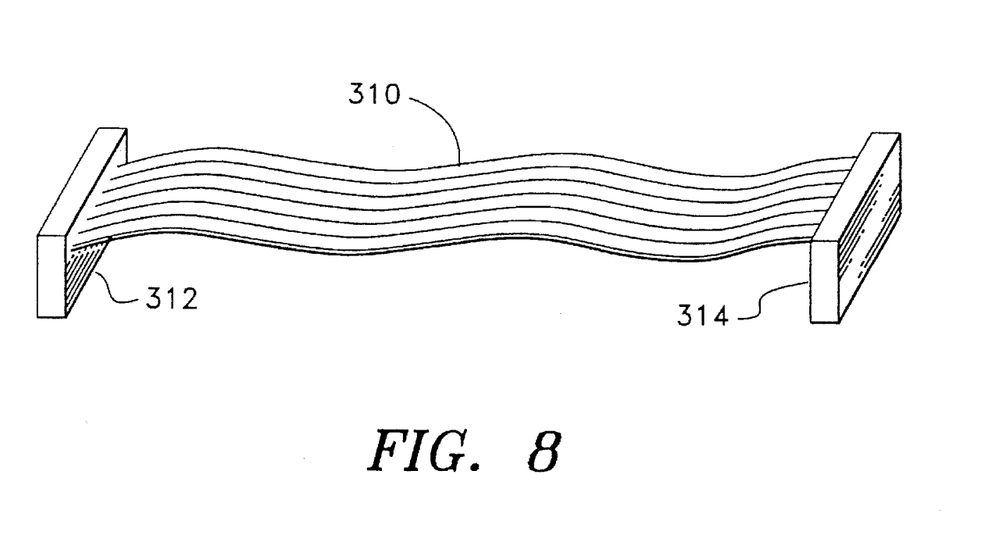
FIG. 8 is a diagram of a first ribbon cable for use with one access module.

The PPSM 222 is coupled to the access module 224 via a ribbon cable 310 (FIGS. 5 and 8). One end of the ribbon cable 310 having a connector 312 is coupled to the PPSM connector 195 while the other end of the cable 310 having a connector 314 is coupled to a third connector 316 (FIG. 6B) on the access module 224.

Figure 6A:
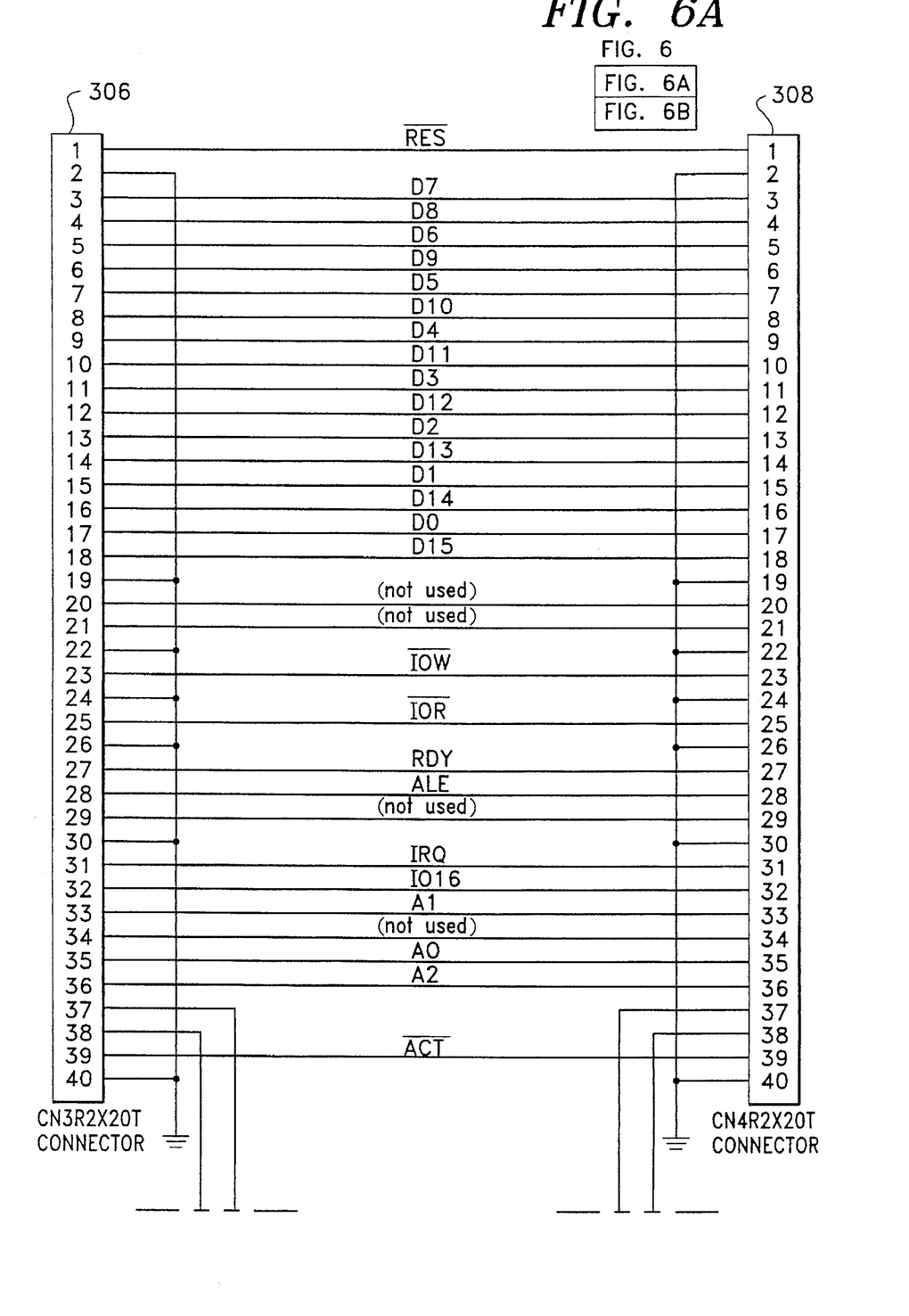
FIGS. 6A and 6B together constitute a wiring diagram of the access module.
Figure 6B:
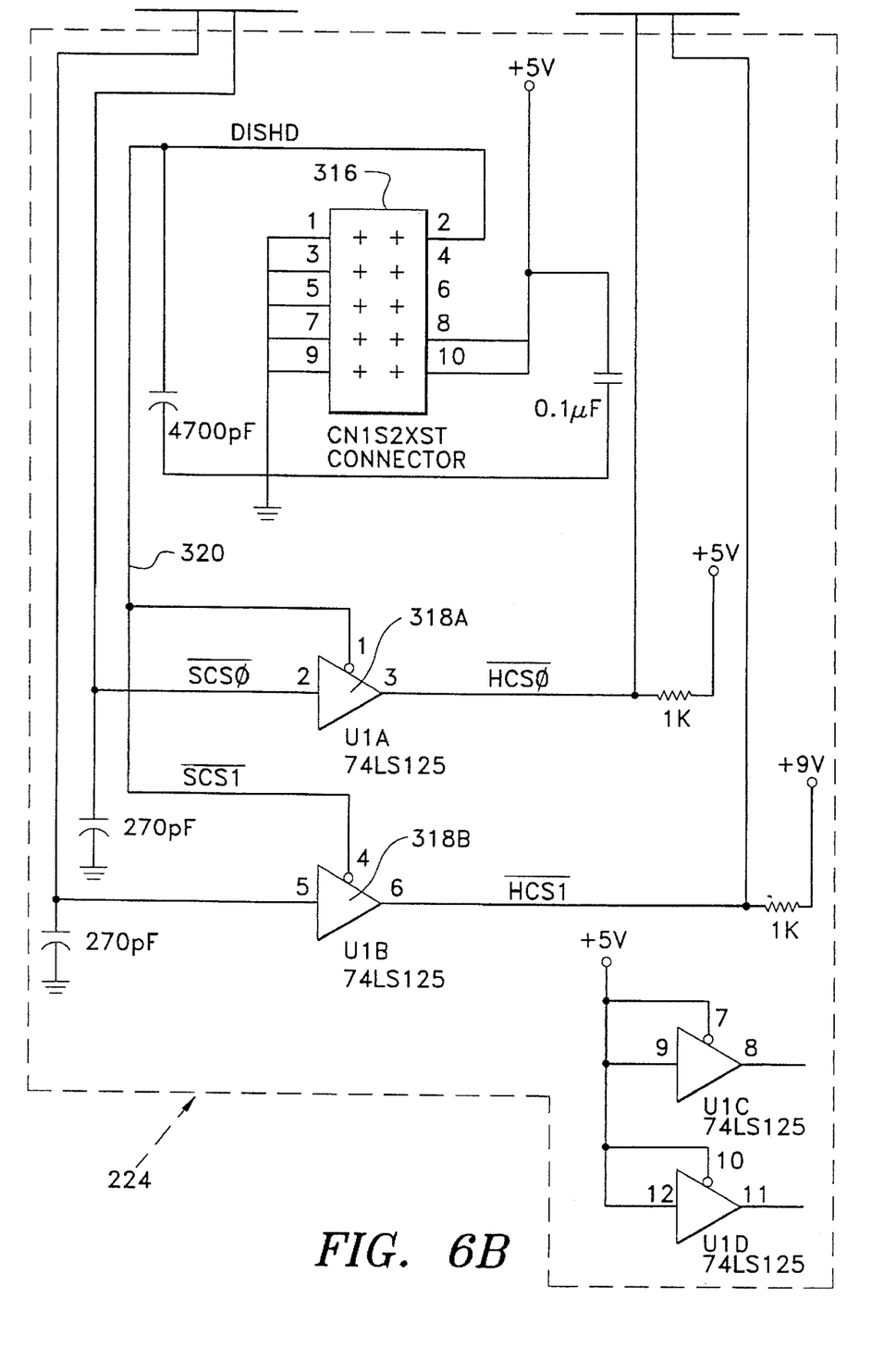

With the access module 224, the hard disk 34, and the PPSM 222 coupled together as shown in FIG. 5, the access module 224 wiring diagram of FIGS. 6A and 6B can now be discussed.

As can be seen in FIGS. 6A and 6B, the access module 224 passes all of the signals from the standard IDE cable 300 to the hard disk 34. However, the Select Hard Disk Controller (HDC) Data and Control I/O Ports Signal and the Select HDC Control I/O Port Signal are each diverted through respective buffers 318A and 318B (e.g., 74LS125A Buffer). In particular, the Select Hard Disk Controller (HDC) Data and Control I/O Ports Signal is fed to the buffer 318A as input signal $\overline{SCS0}$, while the Select HDC Control I/O Port Signal is fed to the buffer 318B as input signal $\overline{SCS1}$. The respective buffer output signals are indicated by $\overline{HCS0}$ and $\overline{HCS1}$. The buffers 318A and the 318B are controlled by a single signal on control line 320. With the ribbon cable 310 coupled to the access module 224 via the connectors 314/316, the DISHD/$\overline{DISHD}$ signal is fed to control line 320 from the PPSM 222. Therefore, the state of the DISHD signal controls whether the input select signals $\overline{SCS0}$ and $\overline{SCS1}$ are permitted to pass through the buffers 318A/318B (indicated as $\overline{HCS0}$ and $\overline{HCS1}$, respectively) and thereby select a hard disk 34 or, are denied passage through these buffers, thereby preventing the selection of a hard disk 34.

Figure 7:
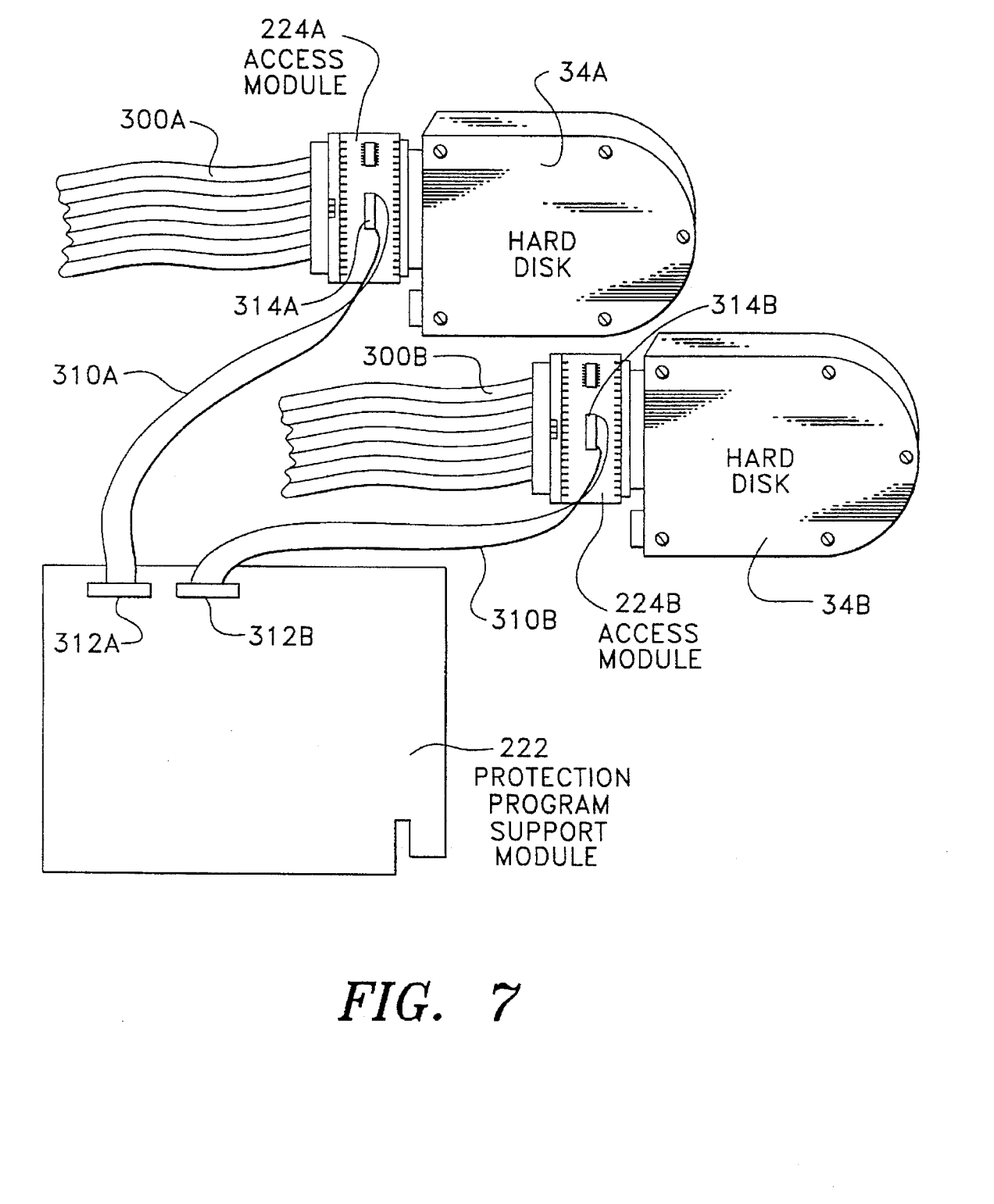
FIG. 7 is an electrical connection interface of the access module, PPSM and two hard disks.
Figure 9:
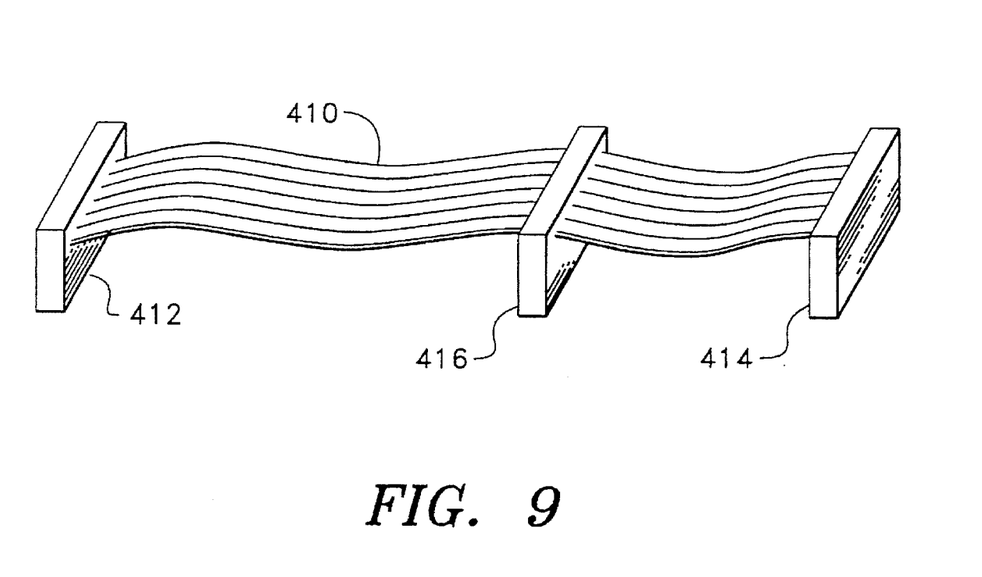
FIG. 9 is a diagram of a second ribbon cable for use with two access modules.
Figure 10:
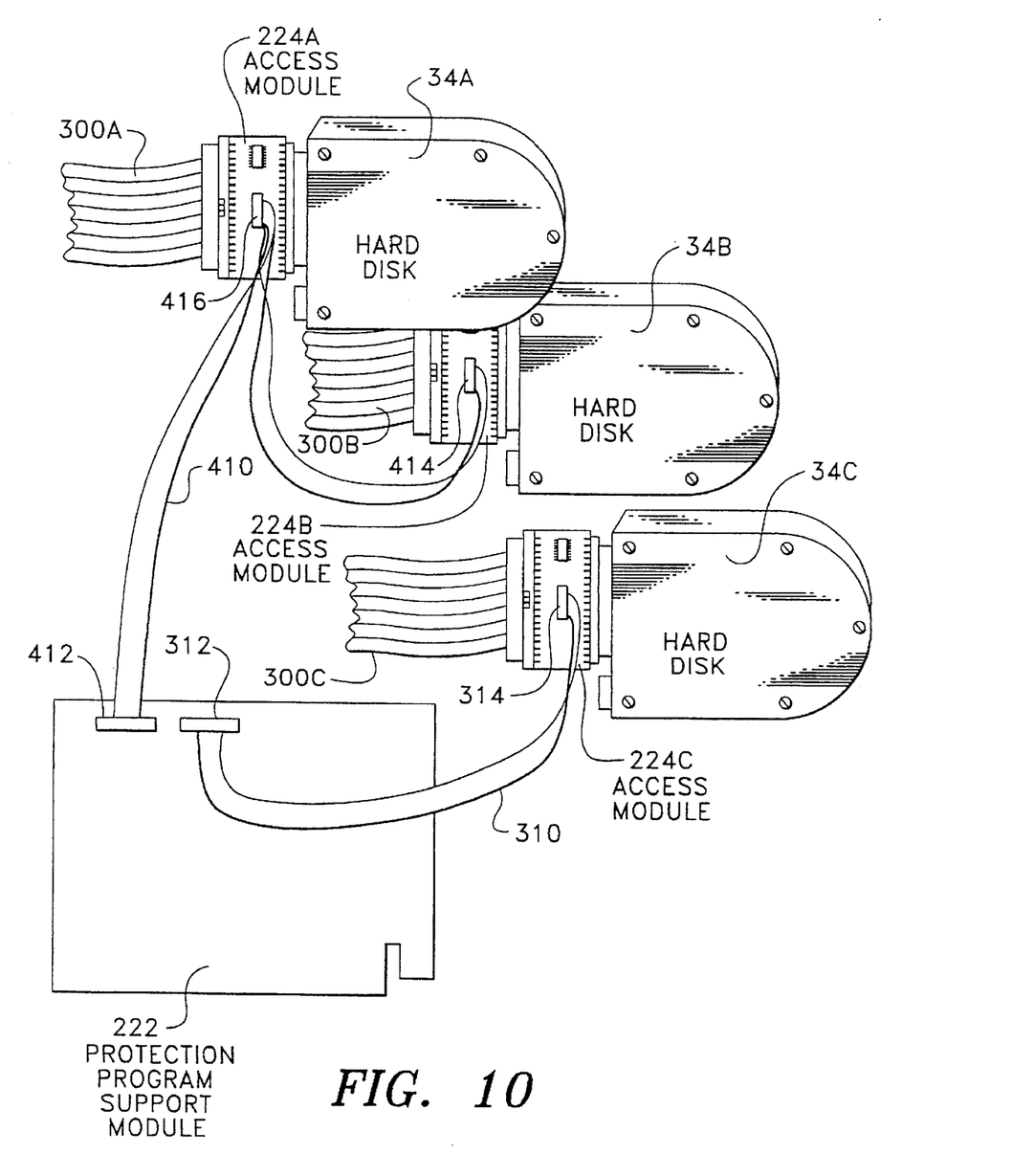
FIG. 10 is an electrical connection interface to a plurality of hard drives using first and second ribbon cables.

It should be understood that the access module 224 is not intended to be limited to the use of buffers only; any type of switching mechanism that can be activated/de-activated by the DISHD/$\overline{DISHD}$ signal is intended by the applicants.

Where there are two hard disks (34A and 34B) in the personal computer, the HDPS 220 can protect both hard disks 34A/34B via the use of two ribbon cables 310A and 310B in conjunction with a respective access modules 224A and 224B coupled to hard disks 34A and 34B, respectively. In particular, as shown in FIG. 7, one ribbon cable 310A is connected between the PPSM connector 195 and the access module 224A, while another ribbon cable 310B is coupled between the PPSM connector 194 and a second access module 224B. The second access module 224B is coupled in a similar fashion between the second hard disk 34B and its corresponding standard IDE cable 300B.

Where three hard disks (34A, 34B and 34C having respective access modules 224A, 224B and 224C coupled thereto) are available in a personal computer, a variation of the ribbon cable 310 is used, as shown in FIG. 9 at 410. In particular, as shown in FIG. 9, the ribbon cable 410 comprises a connector 412 (identical to the connector 312) at one end, a connector 414 (identical to the connector 314) at the other end of the cable 410; in addition, the cable 410 includes a central connector 416 that is identical to the connector 414. This ribbon cable 410 allows a single ribbon cable to couple two access modules 224A and 224B to one PPSM 222, as shown in FIG. 10. The third hard disk 34C is coupled to the PPSM 222 via a ribbon cable 310.

Figure 11:
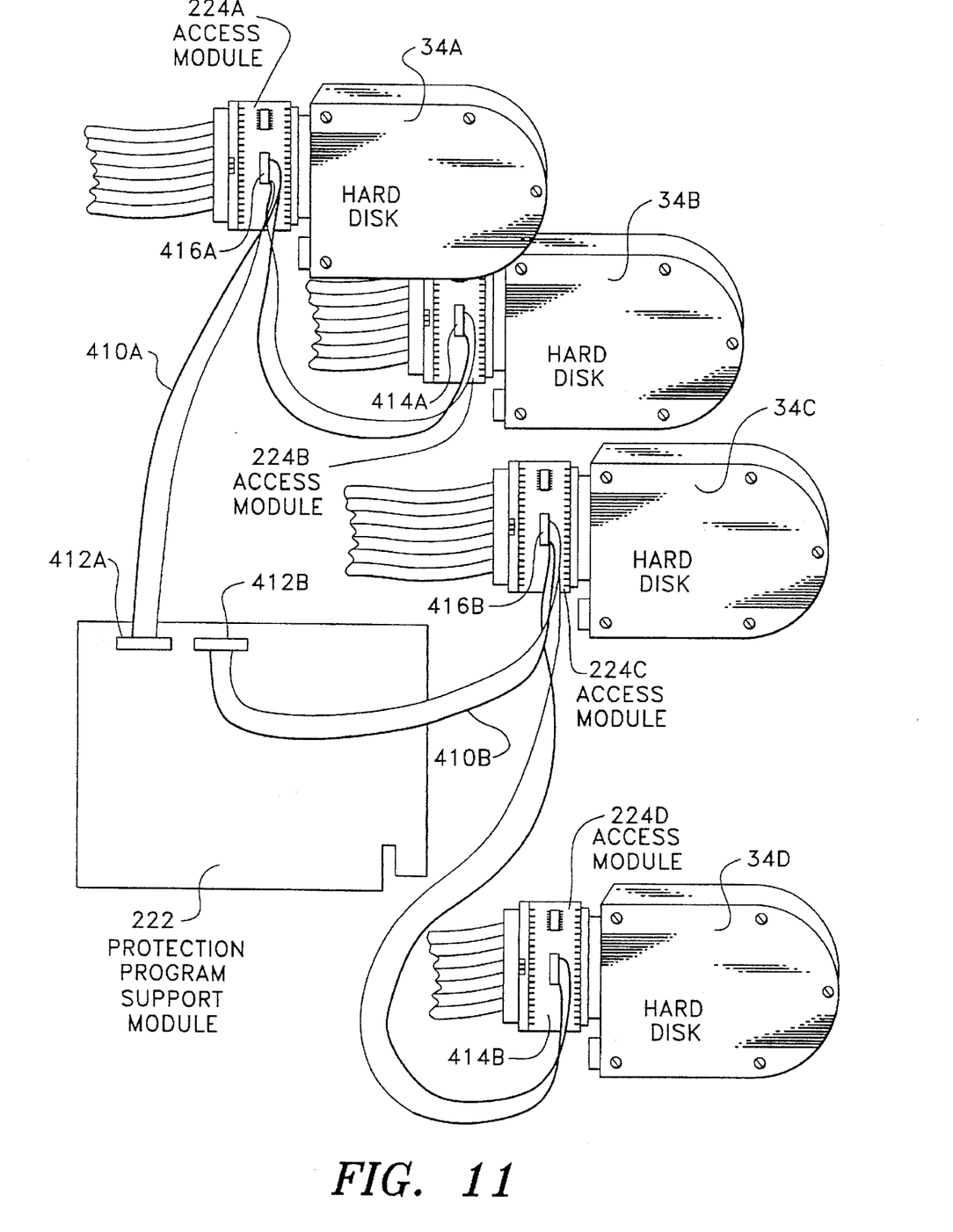
FIG. 11 is an electrical connection interface to a plurality of hard drives using second ribbon cables only.

FIG. 11 depicts the connections made when four hard disks (34A, 34B, 34C and 34D having respective access modules 224A, 224B, 224C and 224D coupled thereto) are available and the HDPS 220 is installed. In that situation, two ribbon cables 410 are used to couple pairs of hard drives to the PPSM 222.

Without further elaboration, the foregoing will so fully illustrate our invention that others may, by applying current or future knowledge, readily adopt the same for use under various conditions of service.

We claim:

1. A hard disk protection system for protecting data on a hard disk of a personal computer having a non-ISA bus and having a base IDE connection level and wherein the personal computer is available to a plurality of users, the hard disk having logical disk structure having sector access rules including an operating system having logical drives, said system comprising:

protection programs that generate a respective access map for each user to map each logical drive into a corresponding adjustable virtual zone, said adjustable virtual zone permitting each user to modify the sector access rules for the user's data, and a hardware module, responsive to said protection programs, that either allows or denies access to the hard disk based on said modified sector access rules, said hardware module having a first memory that is inaccessible to the central processing unit and a second memory that is accessible to the central processing unit, said hardware module including an access module that is coupled to the hard disk at the IDE connection level for permitting or denying access to the hard disk when commanded by said hardware module.

2. The system of claim 1 wherein the computer further comprises a power-on self test and an INT13H handler and wherein said protection programs comprise:

a protection initialization program for creating said access map upon start-up or reset of the computer, said protection initialization program receiving control from a power-on self test via an initial key program;

a disk request handler program for analyzing disk requests before the INT13H handler can process the disk requests, said disk request handler program being entered via a disk request handler key program;

a protection control program for providing an interface between the particular user and said system; and a protection control command handler for checking incoming commands from said protection control program via a protection control command handler key program.

3. The system of claim 2 wherein said protection initialization program comprises:

means for verifying a user name and a user password;

means for generating service data for each user for determining said adjustable virtual zones;

means for allocating disk space on the hard disk for establishing said adjustable virtual zone for each logical drive; and means for changing the address of the INT 13H BIOS handler in the interrupt vector table.

4. The system of claim 3 wherein said service data comprises a first set of data and a second set of data, said first set of data being unique for each logical drive and being stored at the end of each logical drive on the hard disk and said second set of data being stored in said first memory.

5. The system of claim 4 wherein said first set of data comprises a list of directory and file descriptors, a map of access rights, a disk space partitioning table, a cluster affiliation table, a main file allocation table and a list of disk control and address parameters.

6. The system of claim 5 wherein said second set of data comprises a list of user names and passwords.

7. The system of claim 5 wherein a first one of the fixed zones of the logical disk structure occupies the disk space from the sector containing the description of the logical drive partition to the loading sector of the disk, inclusive, the first zone being monitored and controlled by said disk request handler program for permitting access for reading only of information on the hard disk.

8. The system of claim 5 wherein a second one of the fixed zones of the logical disk structure occupies the disk space from the first sector of the first copy of the logical-drive file allocation table to the first sector of the root directory of the disk, the second zone being monitored and controlled by said disk request handler program for permitting access for reading of, and for making permitted changes to, information on the hard disk.

9. The system of claim 5 wherein a third one of the fixed zones of the logical disk structure occupies the disk space from the first to the last sector of the disk root directory, inclusive, the third zone being monitored and controlled by said disk request handler program for permitting access for reading of, and for making permitted changes to, information on the hard disk.

10. The system of claim 5 wherein a fourth one of the fixed zones of the logical disk structure occupies the disk space at the end of the logical drive, the zone having a beginning location, the fourth zone being monitored and controlled by said disk request handler program for permitting access for reading of, and for making permitted changes to, information on the hard disk.

11. The system of claim 5 wherein said protection programs create a hidden zone for each logical drive, said hidden zone comprising a size that occupies the disk space from the first sector of the first cluster of the disk to the beginning location of said hidden zone that occupies the disk space at the end of the logical drive, said hidden zone being monitored and controlled by said disk request handler for prohibiting any access for reading or writing, said size being determined by said list of directory and file descriptors, said access map, said cluster table and said main file allocation table.

12. The system of claim 2 wherein each of said key programs can switch said hardware module into either a passive mode or an active mode, said passive mode permitting said protection programs to be read without affecting access to the hard disk by the central processing unit, said active mode hiding said protection programs from the central processing unit and denying access to the hard disk, each of said key programs being stored in said second memory and having a corresponding memory address.

13. The system of claim 2 wherein said initial key program receives control from the BIOS ROM Scan procedure.

14. The system of claim 5 wherein said disk request handler program uses said disk space partitioning table to interpret any hard disk request involving reading or altering of information on the hard disk in one of the fixed set of zones.

15. The system of claim 14 wherein said disk request handler program utilizes said map of access rights and said cluster affiliation table for responding to the hard disk request for a particular one of the fixed set of zones.

16. The system of claim 3 wherein said means for changing the address of the INT 13H BIOS handler in the interrupt vector table replaces the address of the original handler of INT 13H BIOS in the interrupt vector table with said corresponding address of said disk request handler key program before the operating system is loaded.

17. The system of claim 2 wherein said protection control command handler key program transfers control from said protection control program to said protection command request handler program.

18. The system of claim 5 wherein said protection control command handler program comprises:

means for monitoring the access privilege of a calling program;

means for registering new users;

means for deleting a user from said system;

means for changing the status of a file;

means for changing the file attribute;

means for changing a user password; and means for changing a user name.

19. The system of claim 18 wherein said protection control program is the only program that can access said control-command handler program and thereby provide an interface between the user and said system in the execution of said means for registering new users, said means for deleting a user from said system, said means for changing the status of a file, said means for changing the file attribute, said means for changing a user password or said means for changing a user name.

20. The system of claim 2 wherein said protection control program is stored on the hard disk as an ordinary file.

21. The system of claim 2 wherein said protection initialization program, said disk request handler program and said protection control command handler program are stored in said first memory.

22. The system of claim 11 wherein said first set of data is stored in said hidden zone.

23. The system of claim 22 wherein said means for allocating disk space allocates disk space in said hidden zone, said allocation means creating a region of disk space at the end of each logical drive, said allocation means transferring any user files or user directories in said region to clusters which are accessible to the user.

24. The system of claim 3 wherein said protection initialization program further comprises means for converting the values of the deStartCluster fields from real cluster values to virtual cluster values in constructing said file allocation table and thereby forming said adjustable virtual zones, said adjustable virtual zones being formed by eliminating clusters that do not belong to the current user.

25. The system of claim 22 wherein said protection initialization program further comprises means for transferring said map of access rights and said disk space partitioning table to said first memory from said hidden zone whenever the previous user is identical to the current user.

26. The system of claim 22 wherein said protection initialization program further comprises means for converting the values of deStartCluster fields from virtual cluster numbers to real cluster numbers whenever the current user is different from the previous user.

27. The system of claim 5 wherein said access map is constructed based on the deAttributes of the files of the directories belonging to the current user, and wherein:

the clusters belonging to files with ATTR_READONLY=0 and unoccupied clusters receive an access right of ACCESS_FIELD=(1,1);

the clusters belonging to files with ATTR_READONLY=1 receive an access right of ACCESS_FIELD=(1,0);

the clusters belonging to directories receive an access right of ACCESS_FIELD=(0,1); and the clusters which are not accessible to the current user receive an access right of ACCESS_FIELD=(0,0).

28. The system of claim 27 wherein said main file allocation table, said disk space partitioning table and said cluster affiliation table are constructed based on said access map.

29. The system of claim 15 wherein said disk request handler program further comprises means for converting said virtual cluster number into a real cluster number for determining the sector address pertaining to the request.

30. The system of claim 1 wherein the base IDE connection level includes a Select Hard Disk Controller (HDC) Data and Control I/O Ports Signal and a Select HDC Control I/O Port Signal, said access module controlling the passage of the Select Hard Disk Controller (HDC) Data and Control I/O Ports Signal and the Select HDC Control I/O Port Signal.

31. The system of claim 30 wherein said access module is coupled to said hardware module through a first cable having a first end and a second end, said first cable having a first connector at said first end coupled to said hardware module and having a second connector at said second end coupled to said access module.

32. The system of claim 1 wherein the personal computer comprises a plurality of hard disks and wherein the hardware module comprises a plurality of access modules, said plurality of access modules being coupled to a respective one of the plurality of hard disks.

33. The system of claim 32 wherein a first and a second access module are coupled to said hardware module through a second cable having a first end, a second end and a middle portion, said second cable having a first connector at said first end coupled to said hardware module, said second cable having a second connector at said second end coupled to said first access module, and said second cable having a third connector disposed at said middle portion coupled to said second access module.

* * * * *